US009368809B2

(12) United States Patent
Prasad et al.

(10) Patent No.: US 9,368,809 B2
(45) Date of Patent: Jun. 14, 2016

(54) INTERCONNECT AND END PLATE DESIGN FOR FUEL CELL STACK

(71) Applicant: Bloom Energy Corporation, Sunnyvale, CA (US)

(72) Inventors: Paturi Balaji Narasimha Prasad, Bangalore (IN); Ramesha Guntanur, Bangalore (IN); Ananda Sundararajan, Bangalore (IN); Natarajan Ramanan, San Jose, CA (US); Daniel Darga, Pleasanton, CA (US)

(73) Assignee: BLOOM ENERGY CORPORATION, Sunnyvale, CA (US)

( * ) Notice: Subject to any disclaimer, the term of this patent is extended or adjusted under 35 U.S.C. 154(b) by 111 days.

(21) Appl. No.: 14/072,381

(22) Filed: Nov. 5, 2013

(65) Prior Publication Data
US 2014/0127603 A1 May 8, 2014

Related U.S. Application Data

(60) Provisional application No. 61/723,066, filed on Nov. 6, 2012.

(51) Int. Cl.
*H01M 8/02* (2006.01)
*H01M 8/12* (2016.01)

(52) U.S. Cl.
CPC .......... *H01M 8/0247* (2013.01); *H01M 8/0228* (2013.01); *H01M 8/0258* (2013.01); *H01M 8/0276* (2013.01); *H01M 2008/1293* (2013.01); *Y02E 60/50* (2013.01); *Y02E 60/525* (2013.01)

(58) Field of Classification Search
CPC ............ H01M 8/0202; H01M 8/0254; H01M 8/0256; H01M 8/0258–8/0265; H01M 8/026; H01M 8/0276–8/0278; H01M 8/028
See application file for complete search history.

(56) References Cited

U.S. PATENT DOCUMENTS

| 4,135,041 | A | 1/1979 | Jung et al. |
| 4,292,379 | A | 9/1981 | Kothmann |

(Continued)

FOREIGN PATENT DOCUMENTS

| EP | 0615299 A1 | 9/1994 |
| JP | 61148766 | 7/1986 |

(Continued)

OTHER PUBLICATIONS

International Search Report received in connection with international application No. PCT/US2013/068405; mailed Feb. 25, 2014.

(Continued)

*Primary Examiner* — Scott J Chmielecki
(74) *Attorney, Agent, or Firm* — The Marbury Law Group PLLC

(57) ABSTRACT

Various embodiments include interconnects and/or end plates having features for reducing stress in a fuel cell stack. In embodiments, an interconnect/end plate may have a window seal area that is recessed relative to the flow field to indirectly reduce stress induced by an interface seal. Other features may include a thicker protective coating and/or larger uncoated area of an end plate, providing a recessed portion on an end plate for an interface seal, and/or recessing the fuel hole region of an interconnect relative to the flow field to reduce stress on the fuel cell. Further embodiments include providing intermittent seal support to minimize asymmetric seal loading and/or a non-circular seal configuration to reduce stress around the fuel hole of a fuel cell.

12 Claims, 14 Drawing Sheets

(56) References Cited

U.S. PATENT DOCUMENTS

| | | |
|---|---|---|
| 4,755,429 A | 7/1988 | Nickols et al. |
| 4,913,982 A | 4/1990 | Kotchick et al. |
| 5,162,167 A | 11/1992 | Minh et al. |
| 5,213,910 A | 5/1993 | Yamada |
| 5,215,946 A | 6/1993 | Minh |
| 5,248,712 A | 9/1993 | Takeuchi et al. |
| 5,256,499 A | 10/1993 | Minh et al. |
| 5,273,837 A | 12/1993 | Aitken et al. |
| 5,290,642 A | 3/1994 | Minh et al. |
| 5,342,705 A | 8/1994 | Minh et al. |
| 5,368,667 A | 11/1994 | Minh et al. |
| 5,382,315 A | 1/1995 | Kumar |
| 5,453,331 A | 9/1995 | Bloom et al. |
| 5,460,897 A | 10/1995 | Gibson et al. |
| 5,494,700 A | 2/1996 | Anderson et al. |
| 5,501,914 A | 3/1996 | Satake et al. |
| 5,518,829 A | 5/1996 | Satake et al. |
| 5,554,454 A | 9/1996 | Gardner et al. |
| 5,589,017 A | 12/1996 | Minh |
| 5,641,585 A | 6/1997 | Lessing et al. |
| 5,733,499 A | 3/1998 | Takeuchi et al. |
| 5,942,349 A | 8/1999 | Badwal et al. |
| 5,955,392 A | 9/1999 | Takeuchi et al. |
| 5,964,991 A | 10/1999 | Kawasaki et al. |
| 5,981,098 A | 11/1999 | Vitale |
| 6,001,761 A | 12/1999 | Hata et al. |
| 6,183,897 B1 | 2/2001 | Hartvigsen et al. |
| 6,251,534 B1 | 6/2001 | McElroy |
| 6,280,868 B1 | 8/2001 | Badwal et al. |
| 6,348,280 B1 | 2/2002 | Maeda et al. |
| 6,361,892 B1 | 3/2002 | Ruhl et al. |
| 6,406,809 B1 | 6/2002 | Fujii et al. |
| 6,444,340 B1 | 9/2002 | Jaffrey |
| 6,492,053 B1 | 12/2002 | Donelson et al. |
| 6,492,055 B1 | 12/2002 | Shimotori et al. |
| 6,503,653 B2 | 1/2003 | Rock |
| 6,582,845 B2 | 6/2003 | Helfinstine et al. |
| 6,589,681 B1 | 7/2003 | Yamanis |
| 6,635,378 B1 | 10/2003 | Yang et al. |
| 6,638,575 B1 | 10/2003 | Chen et al. |
| 6,777,126 B1 | 8/2004 | Allen |
| 6,803,136 B2 | 10/2004 | Ong et al. |
| 6,835,488 B2 | 12/2004 | Sasahara et al. |
| 6,890,677 B2 | 5/2005 | Klitsner et al. |
| 6,945,266 B2 | 9/2005 | De Tezanos Pinto |
| 7,045,237 B2 | 5/2006 | Sridhar et al. |
| 7,150,934 B2 | 12/2006 | Yoshida et al. |
| 7,632,594 B2 | 12/2009 | Satou et al. |
| 8,173,063 B2 | 5/2012 | Zobl et al. |
| 8,563,180 B2 | 10/2013 | Perry et al. |
| 2002/0012825 A1 | 1/2002 | Sasahara et al. |
| 2002/0081478 A1 | 6/2002 | Busenbender |
| 2002/0127460 A1 | 9/2002 | Pham et al. |
| 2002/0132156 A1 | 9/2002 | Ruhl et al. |
| 2003/0022053 A1 | 1/2003 | Anderson et al. |
| 2003/0082434 A1 | 5/2003 | Wang et al. |
| 2003/0157387 A1 | 8/2003 | Hase et al. |
| 2003/0165730 A1 | 9/2003 | Dohle et al. |
| 2003/0170527 A1 | 9/2003 | Finn et al. |
| 2003/0180602 A1 | 9/2003 | Finn |
| 2004/0101742 A1 | 5/2004 | Simpkins et al. |
| 2004/0115509 A1 | 6/2004 | Yoshida et al. |
| 2004/0151975 A1 | 8/2004 | Allen |
| 2004/0200187 A1 | 10/2004 | Warrier et al. |
| 2004/0265666 A1* | 12/2004 | Weil .................. H01M 8/0273 429/456 |
| 2004/0265675 A1 | 12/2004 | Woodcock et al. |
| 2005/0008921 A1 | 1/2005 | Johnson |
| 2005/0017055 A1 | 1/2005 | Kurz et al. |
| 2005/0019646 A1 | 1/2005 | Joos |
| 2005/0136312 A1 | 6/2005 | Bourgeois et al. |
| 2005/0227134 A1 | 10/2005 | Nguyen |
| 2005/0255364 A1 | 11/2005 | Cho et al. |
| 2006/0154125 A1 | 7/2006 | Na et al. |
| 2006/0192323 A1 | 8/2006 | Zobl et al. |
| 2006/0204826 A1 | 9/2006 | Borchers |
| 2006/0204827 A1 | 9/2006 | Hickey et al. |
| 2006/0240309 A1 | 10/2006 | Dehne |
| 2006/0275649 A1 | 12/2006 | Keller et al. |
| 2006/0286431 A1 | 12/2006 | Chyou et al. |
| 2006/0286432 A1 | 12/2006 | Rakowski et al. |
| 2007/0042257 A1 | 2/2007 | Chyou et al. |
| 2007/0134532 A1 | 6/2007 | Jacobson et al. |
| 2007/0196704 A1 | 8/2007 | Valensa et al. |
| 2007/0207375 A1 | 9/2007 | Jacobson et al. |
| 2007/0231676 A1 | 10/2007 | Cassidy et al. |
| 2008/0081223 A1 | 4/2008 | Yasumoto et al. |
| 2008/0193825 A1 | 8/2008 | Nguyen et al. |
| 2008/0199738 A1 | 8/2008 | Perry et al. |
| 2009/0068535 A1 | 3/2009 | Owejan et al. |
| 2009/0253022 A1* | 10/2009 | Rock .................. H01M 8/0247 429/434 |
| 2009/0286125 A1 | 11/2009 | Setlock et al. |
| 2010/0119909 A1 | 5/2010 | McElroy et al. |
| 2010/0119917 A1 | 5/2010 | Kumar et al. |
| 2010/0129693 A1 | 5/2010 | Nguyen et al. |
| 2010/0159344 A1* | 6/2010 | Gottmann et al. ............ 429/469 |
| 2010/0239937 A1 | 9/2010 | Janousek et al. |
| 2010/0255391 A1* | 10/2010 | Chen .................... H01M 8/023 429/414 |
| 2010/0330461 A1* | 12/2010 | Watanabe ........... H01M 8/0247 429/514 |
| 2011/0129756 A1 | 6/2011 | Erikstrup |
| 2011/0143261 A1 | 6/2011 | Brander et al. |
| 2011/0223510 A1 | 9/2011 | Greiner et al. |
| 2012/0202130 A1 | 8/2012 | Weingaertner et al. |
| 2013/0129557 A1 | 5/2013 | Herchen et al. |
| 2013/0130146 A1 | 5/2013 | Batawi et al. |
| 2013/0130152 A1 | 5/2013 | Couse et al. |
| 2013/0130154 A1 | 5/2013 | Darga et al. |
| 2013/0216927 A1 | 8/2013 | Gottmann et al. |

FOREIGN PATENT DOCUMENTS

| | | |
|---|---|---|
| JP | 6215778 | 8/1994 |
| JP | 09-199143 | 7/1997 |
| JP | 09-223506 | 8/1997 |
| JP | 09-245810 | 9/1997 |
| JP | 09-245811 | 9/1997 |
| JP | 09-277226 | 10/1997 |
| JP | 2000-281438 | 10/2000 |
| KR | 10-2006-0019998 A | 3/2006 |
| WO | WO03/007413 A1 | 1/2003 |
| WO | WO03/071618 A2 | 8/2003 |
| WO | WO2004/102706 A2 | 11/2004 |
| WO | WO2004/102706 A3 | 11/2004 |
| WO | WO2006/016628 A1 | 2/2006 |
| WO | WO2008/094550 | 8/2008 |
| WO | WO2008/103253 | 8/2008 |
| WO | WO2013/074918 | 5/2013 |

OTHER PUBLICATIONS

International Search Report and Written Opinion, International Application No. PCT/US2007/008224, dated Nov. 26, 2008, 10pgs.

International Search Report, International Application No. PCT/US2003/004808, dated Aug. 19, 2003, 9pgs.

Supplementary European Search Report, International Application No. PCT/US2003/004808, Jun. 2, 2008, 3pgs.

International Search Report and Written Opinion, International Application No. PCT/US2010/027899, Oct. 20, 2010, 11pgs.

International Search Report and Written Opinion, International Application No. PCT/US2012/065508, Apr. 14, 2011.

International Preliminary Report on Patentability, International Application No. PCT/US2010/027899, Sep. 20, 2011, 6pgs.

"Powder Metallurgy Design Manual," 3rd Edition, copyright Metal Powder Industries Federation, 1998.

Haynes International High-Temperature Alloys, "HAYNES (Reg.) 214 (TM) alloy," 1996, pp. 1-19.

(56) References Cited

OTHER PUBLICATIONS

Haynes International High-Temperature Alloys, "HAYNES (Reg.) 230 (TM) alloy," 2004, pp. 1-27.
Srivatsan et al., U.S. Appl. No. 14/72,375, filed Nov. 5, 2013.
Darga et al., U.S. Appl. No. 14/072,499, filed Nov. 5, 2013.
Final Office Action for U.S. Appl. No. 14/072,499, filed Nov. 5, 2013, dated Sep. 15, 2015, (16 pages).
International preliminary report on patentability received in connection with international application No. PCT/US2013/068405; mailed May 21, 2015.
Office Action, U.S. Appl. No. 14/072,499, issued May 22, 2015, 15pgs.
U.S. Appl. No. 14/072,375, Office Action issued Mar. 11, 2016, 11pgs.

* cited by examiner

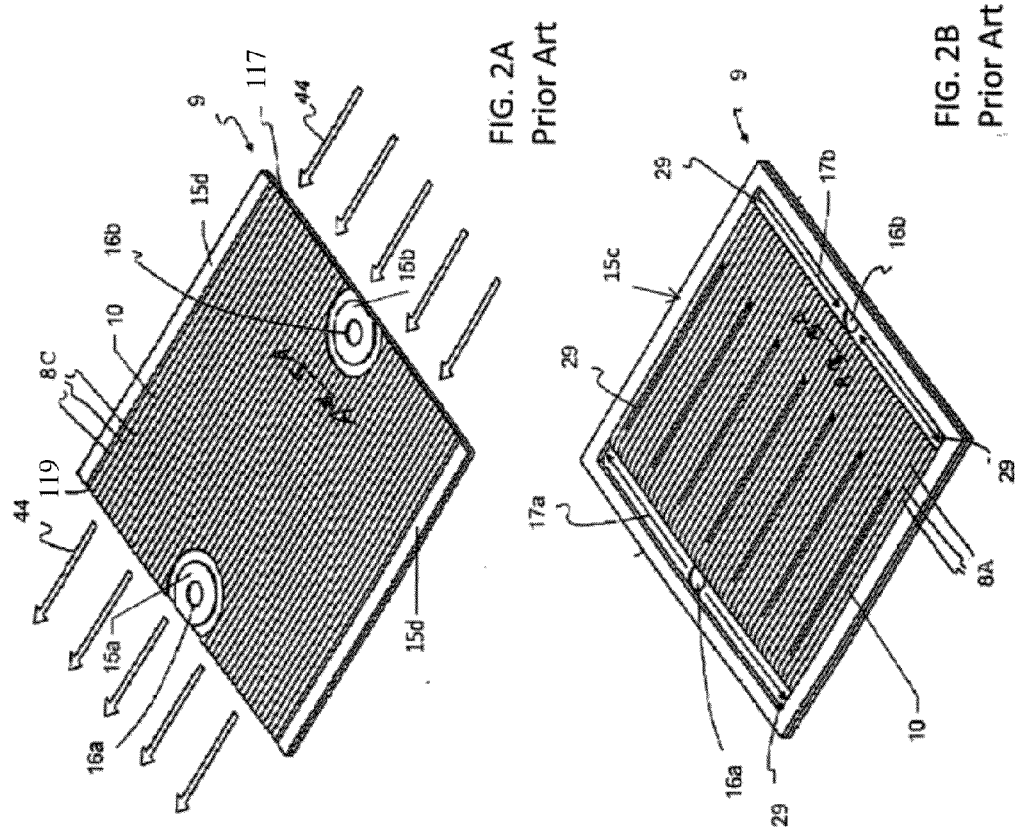

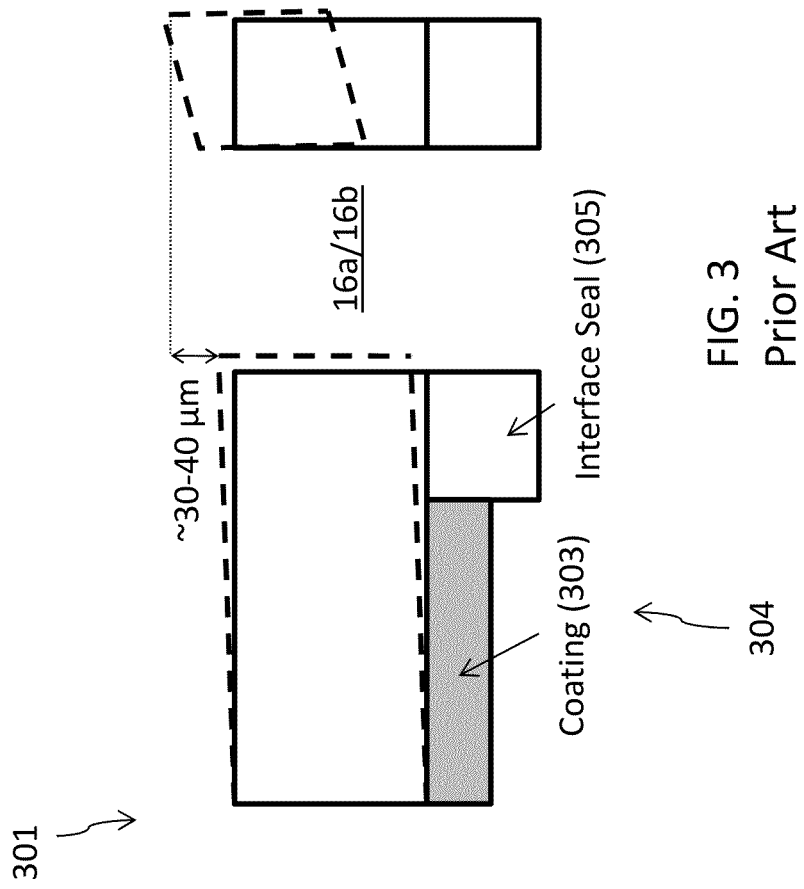

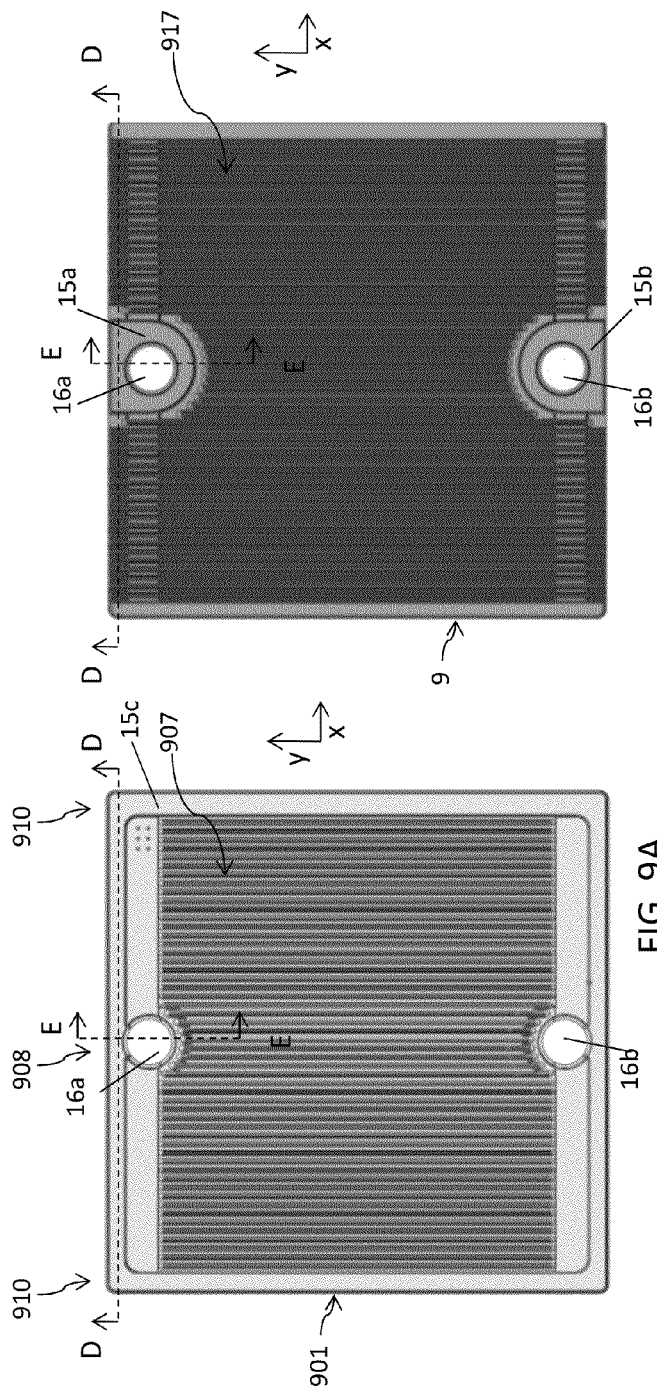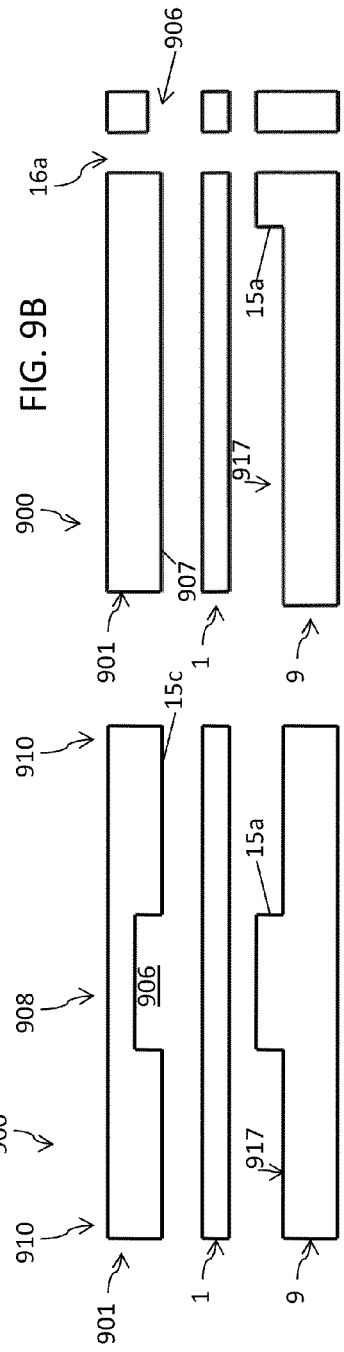

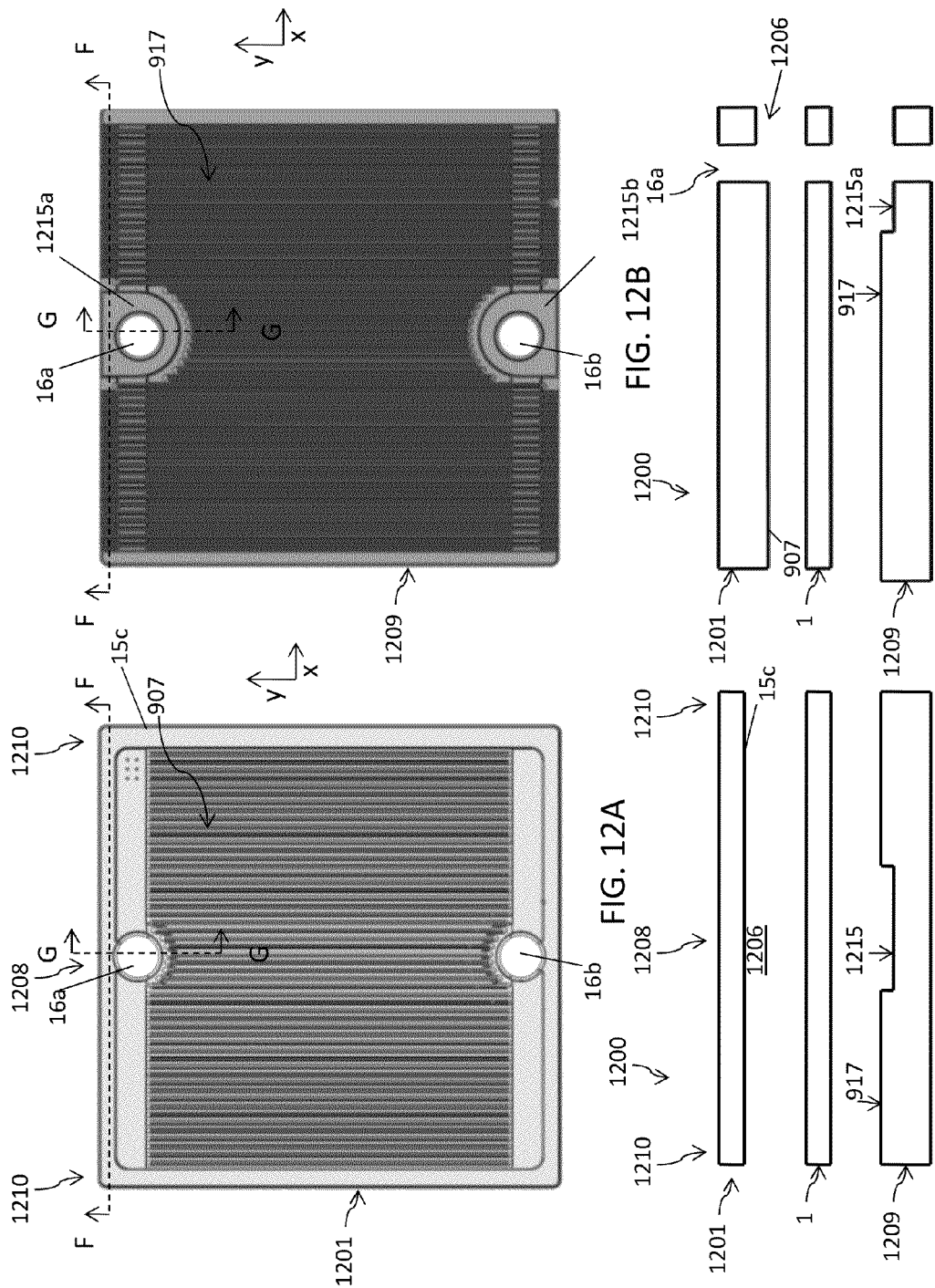

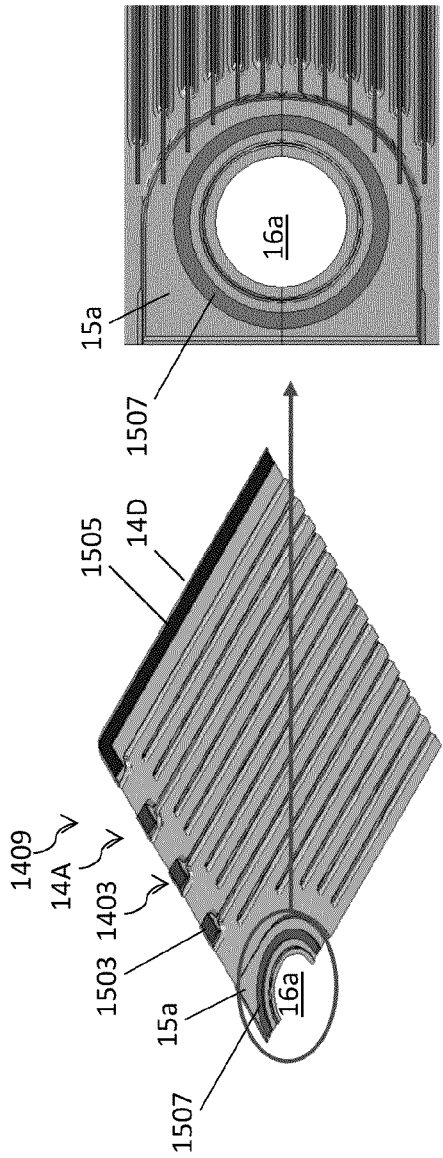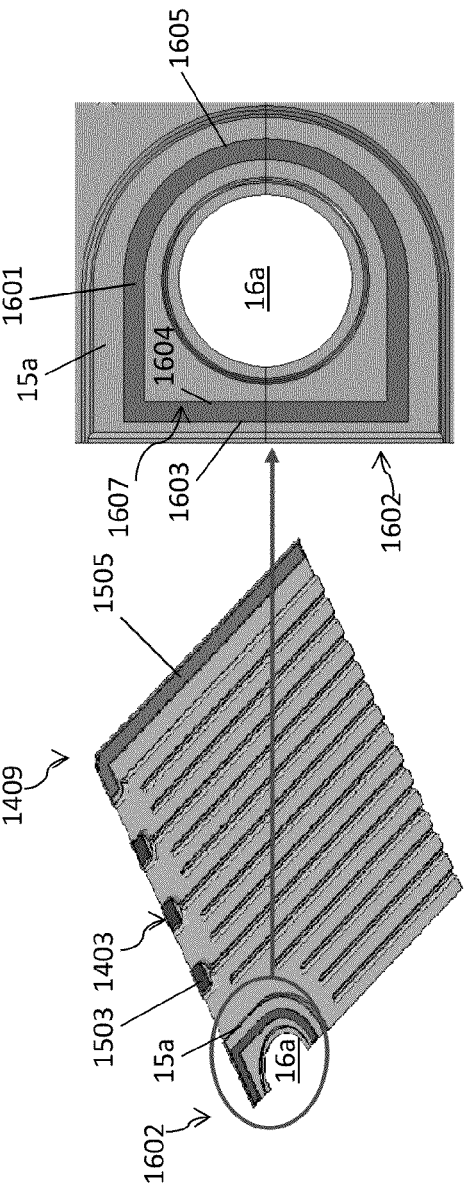

INTERCONNECT AND END PLATE DESIGN FOR FUEL CELL STACK

RELATED APPLICATIONS

This application claims the benefit of priority to U.S. Provisional Application No. 61/723,066, filed on Nov. 6, 2012, the entire contents of which are incorporated herein by reference.

BACKGROUND

In a high temperature fuel cell system, such as a solid oxide fuel cell (SOFC) system, an oxidizing flow is passed through the cathode side of the fuel cell while a fuel flow is passed through the anode side of the fuel cell. The oxidizing flow is typically air, while the fuel flow can be a hydrocarbon fuel, such as methane, natural gas, pentane, ethanol, or methanol. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

In order to optimize the operation of SOFCs, the oxidizing and fuel flows should be precisely regulated. Therefore, the flow regulating structures, such as interconnects (ICs) and end plates (EPs) in the fuel cell system should be precisely manufactured. One type of interconnect and end plate currently used is a metal interconnect/end plate formed by a powder metallurgy technique. SOFC interconnects and end plates require good topography uniformity (flatness) to ensure that the electrolyte does not experience stress concentrations beyond the breaking strength of the electrolyte.

SUMMARY

Embodiments include an interconnect for a fuel cell stack that includes a first side comprising raised features defining a flow field, a second side opposite the first side, and an opening for a reactant extending through the interconnect, wherein the interconnect comprises at least one of: (a) the first side comprises an elevated portion for receiving a window seal that extends around a periphery of the flow field, and a height of at least a portion of the elevated portion is recessed at least proximate to the opening relative to a height of the raised features defining the flow field, (b) the interconnect comprises an end plate having an interface seal located on the second side and surrounding the opening, and the second side comprises a protective coating over at least a portion of the second side, wherein a thickness of the protective coating differs by less than 20% from a thickness of the interface seal, (c) the interconnect comprises an end plate having an interface seal located on the second side and surrounding the opening, and the second side comprises a protective coating over at least a portion of the second side, wherein the interface seal is located on an uncoated portion of the second side, and a periphery of the uncoated portion includes a generally straight portion extending along an outer edge of the end plate and a curved portion facing a middle of the end plate, (d) the interconnect comprises an end plate having an interface seal located on the second side and surrounding the opening, and the second side comprises a protective coating over at least a portion of the second side and wherein the interface seal is located on a recessed portion in the second side and over the protective coating, or (e) the first side comprises a flat elevated surface surrounding the opening, and a height of the elevated surface is recessed relative to a height of the raised features defining the flow field.

Further embodiments include an interconnect for a fuel cell stack that includes a plurality of ribs and channels on a first major surface of the interconnect defining a flow field for a reactant, and a plurality of raised surfaces on the first major surface located between an edge of the interconnect and the flow field, the raised surfaces being intermittently spaced to allow the reactant to flow between the raised surfaces.

Further embodiments include an interconnect for a fuel cell stack that includes a plurality of ribs and channels on a first major surface of the interconnect defining a flow field for a first reactant, an opening extending through the interconnect for a second reactant, an elevated surface on the first major surface of the interconnect surrounding the opening, and a seal on the elevated surface and surrounding the opening, wherein the seal comprises a generally straight segment facing an edge of the interconnect and a curved segment facing a middle of the interconnect, wherein the generally straight segment is defined by a generally straight portion of an outer periphery of the seal and a generally straight portion of an interior opening of the seal.

Further embodiments include methods of fabricating interconnects for a fuel cell stack as described above.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

FIG. 2A is a perspective view of a cathode side of an interconnect of the prior art.

FIG. 2B is a perspective view of an anode side of an interconnect of the prior art.

FIG. 3 is a partial cross-section view of an end plate of a fuel cell stack of the prior art.

FIG. 9A is an overhead view of the anode-facing side of a fuel end plate having a localized recessed portion.

FIG. 9B is an overhead view of the cathode-facing side of an interconnect.

FIG. 10A is an exploded cross-section view of an end of a fuel cell stack taken along line D-D in FIGS. 9A-B.

FIG. 10B is an exploded cross-section view of an end of a fuel cell stack taken along line E-E in FIGS. 9A-B.

FIG. 12A is an overhead view of the anode-facing side of a fuel end plate having a recessed window seal portion extending over the edges of the end plate according to an embodiment.

FIG. 12B is an overhead view of the cathode-facing side of an interconnect having an elevated surface surrounding the fuel hole that is recessed relative to the height of the flow field features according to an embodiment.

FIG. 13A is an exploded cross-section view of an end of a fuel cell stack taken along line F-F in FIGS. 12A-B.

FIG. 13B is an exploded cross-section view of an end of a fuel cell stack taken along line G-G in FIGS. 12A-B.

FIG. 15A is a partial perspective view of a cathode side of an interconnect having a circular seal.

FIG. 15B is an enlarged view of the fuel hole area of the interconnect of FIG. 15A illustrating the circular seal.

FIG. 16A is a partial perspective view of a cathode side of an interconnect having a non-circular seal including a generally straight segment and a curved portion according to an embodiment.

FIG. 16B is an enlarged view of the fuel hole area of the interconnect of FIG. 16A illustrating the non-circular seal according to an embodiment.

DETAILED DESCRIPTION

The various embodiments will be described in detail with reference to the accompanying drawings. The drawings are not necessarily to scale, and are intended to illustrate various features of the invention. Wherever possible, the same reference numbers will be used throughout the drawings to refer to the same or like parts. References made to particular examples and implementations are for illustrative purposes, and are not intended to limit the scope of the invention or the claims.

Various embodiments include interconnects and end plates for a fuel cell stack, fuel cell stacks and systems incorporating such interconnects and end plates, and methods of fabricating interconnects and end plates for a fuel cell stack.

For solid oxide fuel cell stacks, the currently-used interconnects are typically made from an electrically conductive metal material, and may comprise a chromium alloy, such as a Cr—Fe alloy. The interconnects are typically fabricated using a powder metallurgy technique that includes pressing and sintering a Cr—Fe powder, which may be a mixture of Cr and Fe powders, to form a Cr—Fe interconnect in a desired size and shape (e.g., a "net shape" or "near net shape" process). A typical chromium-alloy interconnect comprises more than about 90% chromium by weight, such as about 94-96% (e.g., 95%) chromium by weight. The interconnect may also contain less than about 10% iron by weight, such as about 4-6% (e.g., 5%) iron by weight, may contain less than about 2% by weight, such as about zero to 1% by weight, of other materials, such as yttrium or yttria, as well as residual or unavoidable impurities.

A surface of an interconnect that in operation is exposed to an oxidizing environment (e.g., air), such as the cathode-facing side of the interconnect, may be coated with a protective coating layer in order to decrease the growth rate of a chromium oxide surface layer on the interconnect and to suppress evaporation of chromium vapor species which can poison the fuel cell cathode. Typically, the coating layer, which can comprise a perovskite such as lanthanum strontium manganite (LSM), may be formed using a spray coating or dip coating process. Alternatively, other metal oxide coatings, such as a spinel, such as an $(Mn,Co)_3O_4$ spinel, can be used instead of or in addition to LSM. Any spinel having the composition $Mn_{2-x}Co_{1+x}O_4$ (0≤x≤1) or written as $z(Mn_3O_4)+(1-z)(Co_3O_4)$, where (⅓≤z≤⅔) or written as $(Mn,Co)_3O_4$ may be used.

Figure 1:
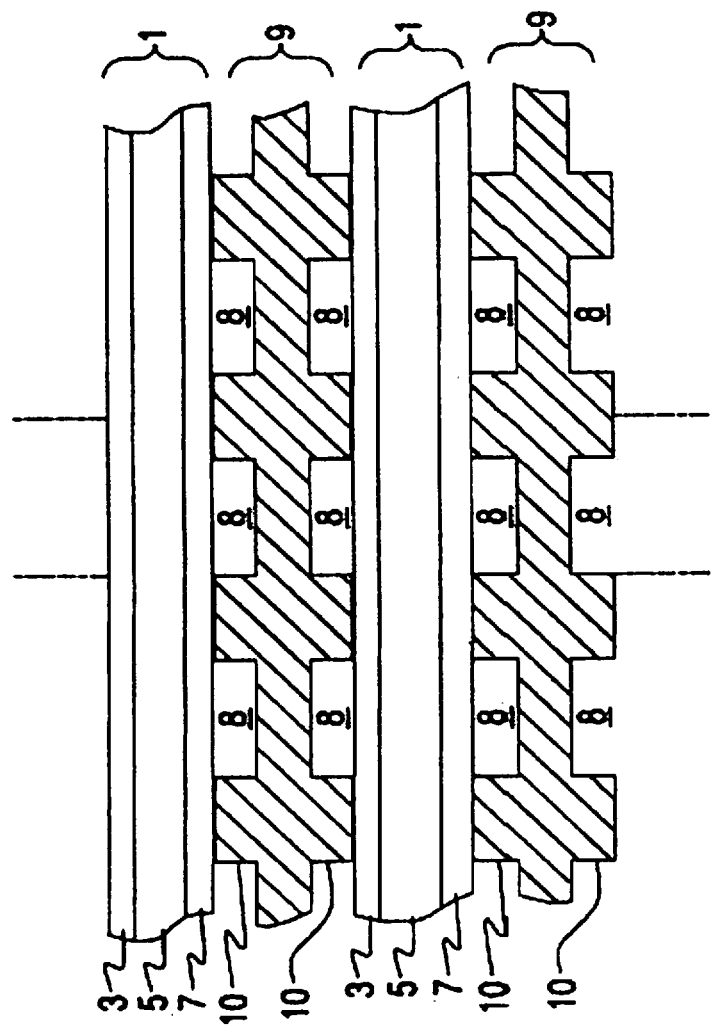
FIG. 1 illustrates a side cross-sectional view of a SOFC stack.

An example of a solid oxide fuel cell (SOFC) stack is illustrated in FIG. 1. Each SOFC 1 comprises a cathode electrode 7, a solid oxide electrolyte 5, and an anode electrode 3. Fuel cell stacks are frequently built from a multiplicity of SOFC's 1 in the form of planar elements, tubes, or other geometries. Fuel and air has to be provided to the electrochemically active surface, which can be large. One or more fuel cell stacks may be thermally integrated with other components of a fuel cell power generating system (e.g., one or more burners, fuel reformers, fluid conduits and manifolds, etc.) in a common enclosure or "hotbox."

The gas flow separator 9 (referred to as a gas flow separator plate when part of a planar stack), containing gas flow passages or channels 8 between ribs 10, separates the individual cells in the stack. Frequently, the gas flow separator plate 9 is also used as an interconnect which electrically connects the anode or fuel electrode 3 of one cell to the cathode or air electrode 7 of the adjacent cell. In this case, the gas flow separator plate which functions as interconnect is made of or contains electrically conductive material. The interconnect/gas flow separator 9 separates fuel, such as a hydrocarbon fuel, flowing to the fuel electrode (i.e. anode 3) of one cell in the stack from oxidant, such as air, flowing to the air electrode (i.e. cathode 7) of an adjacent cell in the stack. At either end of the stack, there may be an air end plate or fuel end plate (not shown) for providing air or fuel, respectively, to the end electrode. As used herein, an interconnect may refer to either an interconnect located between two fuel cells 1 or an end plate located at an end of the stack and directly adjacent to only one fuel cell 1. FIG. 1 shows that the lower SOFC 1 is located between two interconnects 9 and the upper interconnect 9 is located between two SOFCs 1.

FIGS. 2A and 2B show, respectively, top and bottom views of a prior art interconnect 9. The portions of interconnect 9 shown in side cross-section in FIG. 1 are provided along lines A-A in FIGS. 2A and 2B. The interconnect 9 contains gas flow passages or channels 8 between ribs 10. The interconnect 9 in this embodiment includes at least one riser channel 16a for providing fuel to the anode-side of the SOFC 1, as illustrated by arrow 29. The riser channel 16a generally comprises a fuel inlet riser opening or hole that extends through at least one layer of the fuel cells and interconnects in the stack. As illustrated in FIG. 2B, the fuel can flow through the inlet riser channel 16a to the anode-side of each fuel cell. There, the fuel can collect in an inlet plenum 17a (e.g., a groove in the interconnect's surface), then flow over the fuel cell anode 3 through gas flow channels 8A formed in the interconnect 9 to an outlet plenum 17b and then exit through a separate outlet riser channel 16b. It should be noted that the ribs 10 may be positioned in any configuration such that the air and fuel can flow on opposite sides of the interconnect 9 in the same direction (co-flow) or in opposite directions (counter-flow) or at right angles to each other (cross flow) or at any angle in between.

The cathode side, illustrated in FIG. 2A, can include gas flow passages or channels 8C between ribs 10 which direct air flow 44 from an inlet side 117 over the cathode electrode of the fuel cell to an outlet side 119. Elevated flat surfaces 15a, 15b may surround the respective riser channel openings 16a, 16b on the cathode-side of the interconnect 9. A seal material (e.g., a glass or glass ceramic seal material, not shown) may be located on surfaces 15a, 15b in order to seal the cathode side of the interconnect 9 to the fuel cell to prevent fuel from reaching the cathode electrode of the fuel cell. The seals may have a circular or hollow cylinder shape so that the riser channel openings 16a, 16b extend through the hollow middle part of the respective seals. As shown in FIG. 2B, an elevated flat surface 15c may extend around the periphery of the anode-side of the interconnect 9 on which a peripheral (e.g., window) seal (not shown) may be located to seal the anode-side of the interconnect to the fuel cell to prevent air from reaching the anode electrode of the fuel cell. Elevated flat surfaces 15d may extend along two opposing edges of the cathode-side of the interconnect 9 as shown in FIG. 2A upon which strip seals (not shown) may be located to seal the cathode-side of the interconnect to the fuel cell. The elevated surfaces 15d and strip seals may not extend over the edges of the cathode side corresponding to the air flow inlet 117 and outlet 119.

In FIGS. 2A and 2B, the riser channel openings 16a, 16b are shown as fuel inlet and fuel outlet openings in the interconnect 9. This interconnect is configured for a fuel cell stack which is internally manifolded for fuel, in which the fuel travels through the stack through fuel riser channels which are formed by mated openings through the stacked interconnects and fuel cells. Furthermore, the interconnect 9 shown in FIGS. 2A and 2B is configured for a stack which is externally manifolded for air. However, additional openings through the interconnect may be formed, such as on the left and right sides of the interconnect, for the interconnect to be configured for a stack which is internally manifolded for air.

As discussed above, an end plate may be located on either end of the fuel cell stack. An end plate may have a first side facing an adjacent fuel cell 1 which may include features (e.g., gas flow passages or channels 8 between ribs 10) defining a fuel or air flow field. A second side of the end plate opposite the first side may comprise a generally flat surface that lacks flow field defining features. For a fuel cell stack that is internally manifolded for fuel and externally manifolded for air, for example, each end plate may have a first side that is configured as shown in FIG. 2A or FIG. 2B (depending on whether the side faces the cathode-side or the anode-side of the adjacent fuel cell) and a second generally flat side that may interface with an adjacent fuel cell stack, a fuel manifold, an internal surface of a hot box, etc.

Mitigation of SOFC Stack Stress from Interface Seal

Stack to stack interface seals are used in stack conditioning and hot box operation to ensure that the fuel in the fuel riser does not mix with the ambient air surrounding the stack. Such mixing causes combustion, loss of useful fuel and improper stack conditioning resulting in stack yield loss or ultimately low efficiency and life in the hotbox. The interface seals occupy a volume and therefore end plate design needs to accommodate the volume requirement. A flat endplate with no allowance for the interface seal will locally deform at the elevated fuel cell operating temperature, which in turn applies stress on the cell adjacent to the endplate possibly causing it to crack and fail.

Various embodiments are directed to design features that help mitigate the yield loss created by the interaction of the stack with the interface seal. In a first embodiment, a recess may be provided in a window seal region of the fuel end plate (e.g., the end plate which faces the anode/fuel electrode of the last cell at the end of the stack) to indirectly minimize the stress on the adjacent cell. In a second embodiment, the fuel and/or air end plate (e.g., the end plate which faces the cathode/air electrode of the last fuel cell at the opposite end of the stack) may have a relatively thick protective coating layer with an enlarged uncoated region in the area of the interface seal such that the fuel and/or air end plate is less sensitive to interface seal misalignment and includes more room for the volume of the interface seal. In a third embodiment, a recessed portion may be provided on the flat side of the end plate in the area of the interface seal. A protective coating may be provided over the entire flat side of the end plate (i.e., no uncoated regions) and the interface seal may be provided over the protective coating in the recessed portion. This may additionally reduce the cost of an additional grit blasting operation to remove a surface oxide (e.g., chromium oxide) layer following a controlled oxidation step and before the interconnects/end plates are placed into a stack.

FIG. 3 shows a partial cross-section of the end plate 301, protective coating 303 and interface seal 305 at one end of a prior art fuel cell stack. The interface seal 305 may be located on the generally flat side 304 of the end plate 301, and may have a circular or hollow cylinder shape so that the riser channel openings 16a, 16b extend through the hollow middle part of the respective seals 305. The as-deposited interface seal 305 may be thicker than the coating 303 before it reflows and sets during a "sintering" anneal. As described in commonly-owned U.S. Published Patent Application No. 2013/0216927, which is incorporated by reference herein, "sintering" includes processes for heating, melting and/or reflowing a glass or glass-ceramic seal precursor materials to form seals in a fuel cell stack, which may be performed at elevated temperature (e.g., 600-1000° C.) in air/inert gas. "Conditioning" includes processes for reducing a metal oxide (e.g., nickel oxide) in an anode electrode to a metal (e.g., nickel) in a cermet electrode (e.g., nickel and a ceramic material, such as a stabilized zirconia or doped ceria) and/or heating the stack during performance characterization/testing, and may be performed at elevated temperature (e.g., 750-900° C.) while fuel flows through the stack. The sintering and conditioning of the fuel cell stack may be performed during the same thermal cycle (i.e., without cooling the stack to room temperature between sintering and conditioning). Applicants have discovered that during the sintering and conditioning processes, the interface seal 305 may cause the endplate 301 to deform (e.g., along an edge of the endplate 301, proximate the riser channel opening(s) 16a/16b), as depicted by the angled broken lines. This deformation may be on the order of 30 to 40 microns. This deformation imparts a stress on the adjacent fuel cell through the end plate to cell seals, which may cause the end plate to separate from the rest of the stack and/or a crack to form on the fuel cell near the fuel hole. This may be a local phenomenon caused by the interface seal near the fuel holes. The problem may be further exacerbated by interface seal misalignment with respect to the uncoated region. Misalignment of the interface seal 305 may result in at least a portion of the interface seal 305 being located on top of the coating 303, which further increases the deformation of the end plate 301 and the stresses imparted on the adjacent fuel cells and seals.

Figure 4A:
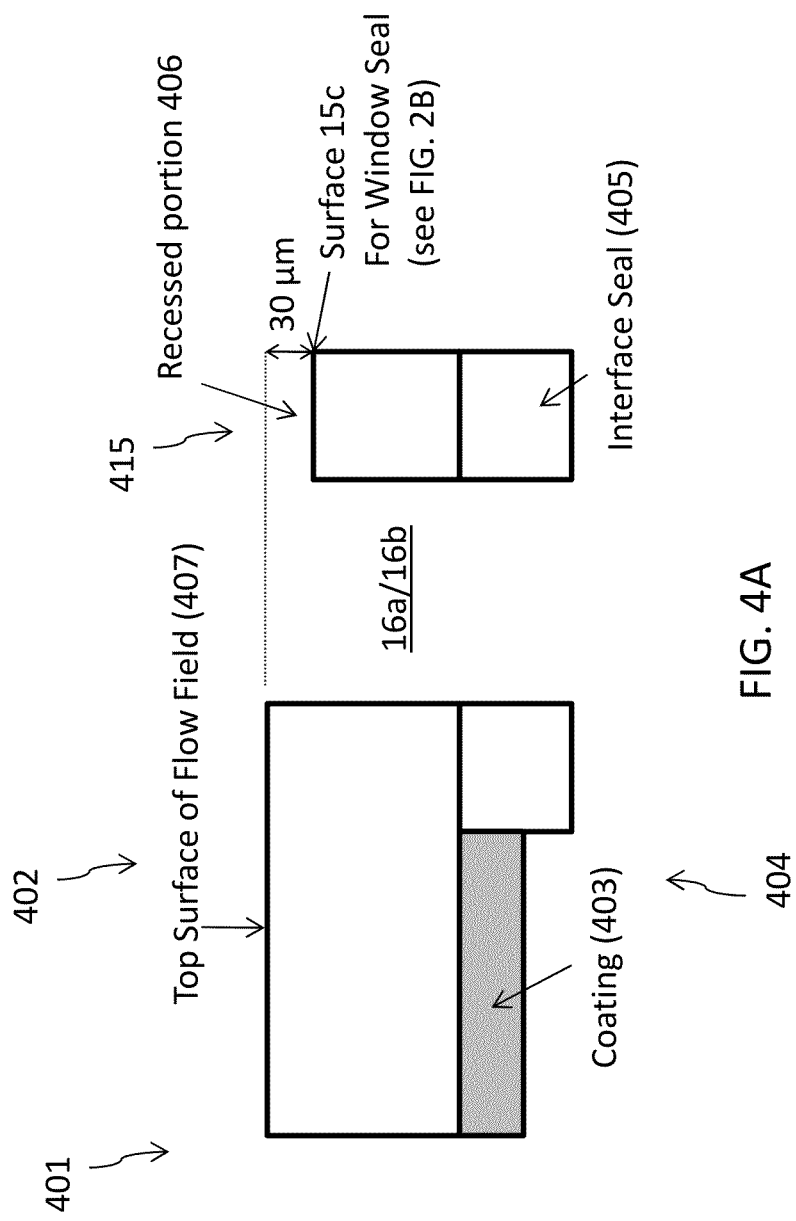
FIG. 4A is a partial cross-section view of an end plate having a recessed portion on an anode-facing side of the end plate according to an embodiment.
Figure 4B:
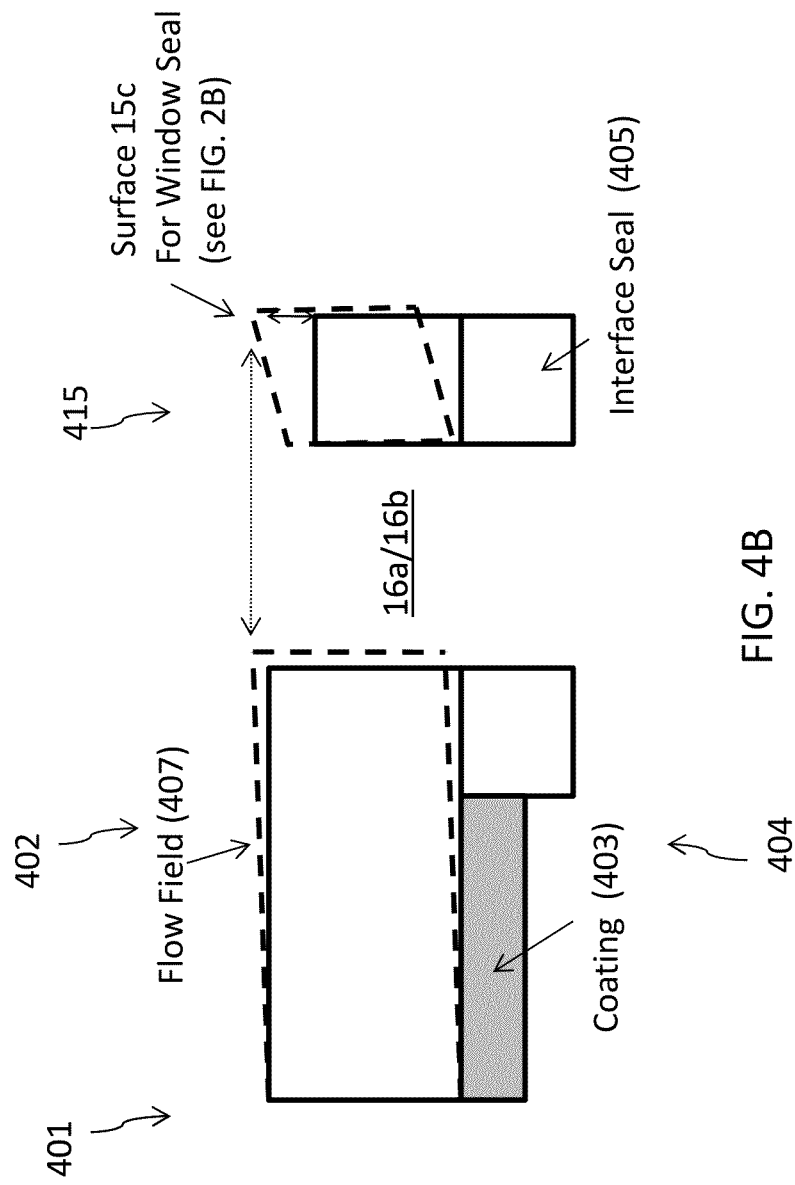
FIG. 4B is a partial cross-section view of the end plate of FIG. 4A schematically illustrating a deformation.

In a first embodiment shown in FIGS. 4A-B, a fuel cell fuel end plate 401 includes a recessed portion 406 over at least a portion of the window seal area 415 (i.e., the area of the elevated flat surface 15c extending around the periphery of the anode-facing side of the end plate as shown in FIG. 2B) on the fuel side 402 of the end plate 401. The recessed portion 406 may be recessed relative to the top surface of the fuel flow field 407, which may be defined by the tops of the ribs 10 forming the fuel flow channels 8A, as shown in FIG. 2B. The recessed portion 406 may be recessed by an amount similar to the deformation amount, such as by 30 microns or more, for example 30-40 microns. The recessed portion 406 may mitigate the stress on the adjacent fuel cell electrolyte due to deformation caused by the stack-to-stack interface seal. Since end plates and interconnects are typically made with the same punch geometry, the same recess may be applied to interconnects located between two fuel cells in the stack (see FIG. 1) as well as to the fuel end plate at the end of the stack as shown in FIG. 4A. A recessed portion 406 on interconnects located between two fuel cells may also help to hide topography variations that may occur on the window seal areas of the interconnects, especially near the fuel holes, minimizing the risk of high stress on the electrolyte in the region.

FIGS. 4A and 4B are partial cross-section views of a fuel cell end plate 401 schematically illustrating the stress-mitigation resulting from a recessed portion 406 on the window seal area 415 of the end plate. As shown in FIGS. 4A and 4B, the flow field 407 (e.g., fuel flow channels and ribs) and window seal area 415 are located on the fuel side 402 of the fuel end plate 401 which faces the rest of the fuel cell stack located above the fuel end plate 401. Alternatively, the fuel end plate 401 may be turned 180° and be located at the top of the fuel cell stack. A window seal (not shown) may be located on the window seal area 415 around the periphery of the flow field 407 to seal the end plate 401 to the adjacent fuel cell and keep fuel and air from mixing. The opposite (e.g., flat) side 404 of the end plate 401 may face an adjacent fuel cell stack (e.g., the top air end plate of another stack) or another component of a hot box, such as a fuel distribution manifold described and shown in FIG. 13A of commonly-owned U.S. Published Patent Application No. 2012/0202130, which is incorporated by reference herein. The interface seal 405 may be located over the flat side 404 of the end plate 401 around the opening of the fuel inlet/outlet riser channel 16a/16b. The interface seal 405 may seal the inlet/outlet fuel riser channel 16a/16b to an external fluid conduit, which may be a riser channel of an adjacent fuel cell stack. The coating layer 403 may comprise a protective coating, which may be metal or metal oxide (e.g., lanthanum strontium manganate, manganese cobalt oxide (MCO) spinel, etc.), provided over a majority of the flat side 404 of the end plate 401 except in the interface seal area. As discussed above in connection with FIG. 3, the interface seal 405 may cause the endplate 401 to deform (e.g., along an edge of the endplate 401, proximate the riser channel opening(s) 16a/16b), as depicted by the angled broken lines in FIG. 4B. However, because the recessed portion 406 is recessed by an amount generally equal to the amount of the end plate deformation (e.g., 30 to 40 microns), the stress imparted on the adjacent fuel may be minimized or eliminated, which may improve the yield and durability of the fuel cell stacks.

The recessed portion 406 may be located at least adjacent to both the inlet and outlet riser channel openings 16a, 16b, which may be located on opposite edges of the end plate 401 (see FIG. 2B). Furthermore, although FIGS. 4A-B illustrate a fuel cell end plate 401, a recessed portion 406 may also be located on the window seal area of an interconnect located between two fuel cells in a fuel cell stack (e.g., on the flat elevated portion 15c of the fuel side of the interconnect 9 shown in FIG. 2B).

Figure 5:
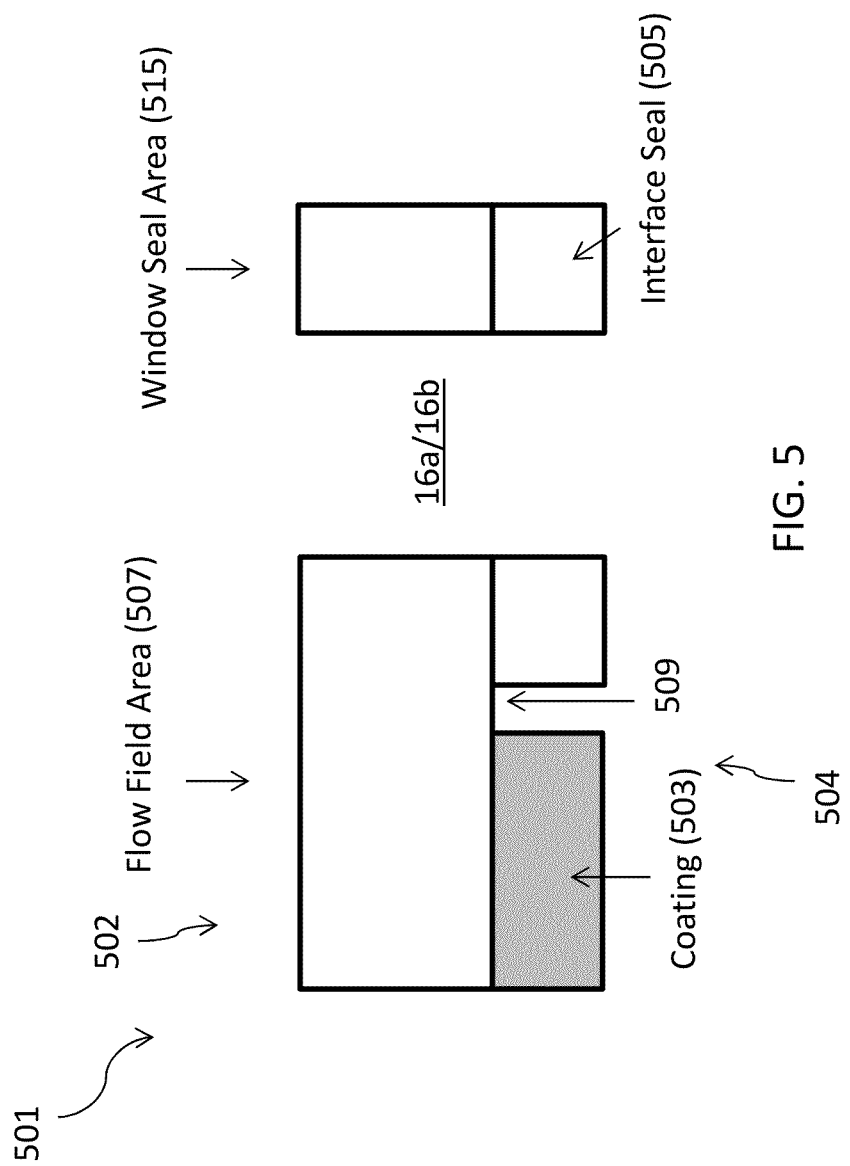
FIG. 5 is a partial cross-section view of an end plate having a relatively thick protective coating and a relatively larger uncoated region according to an embodiment.
Figure 6:
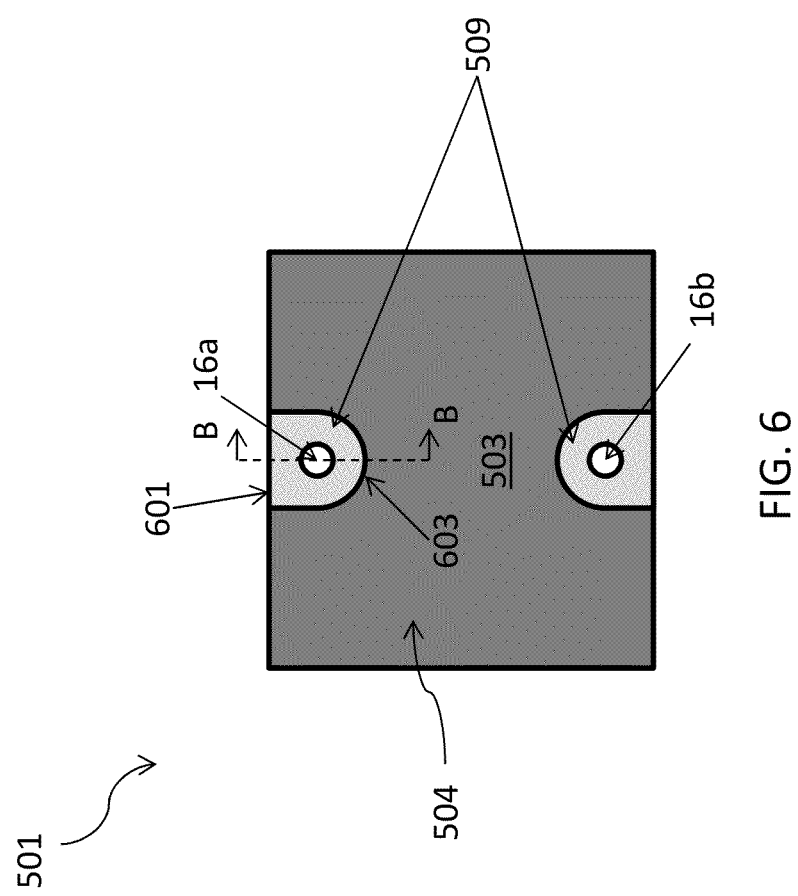
FIG. 6 is an overhead view of the end plate of FIG. 5.
Figure 7:
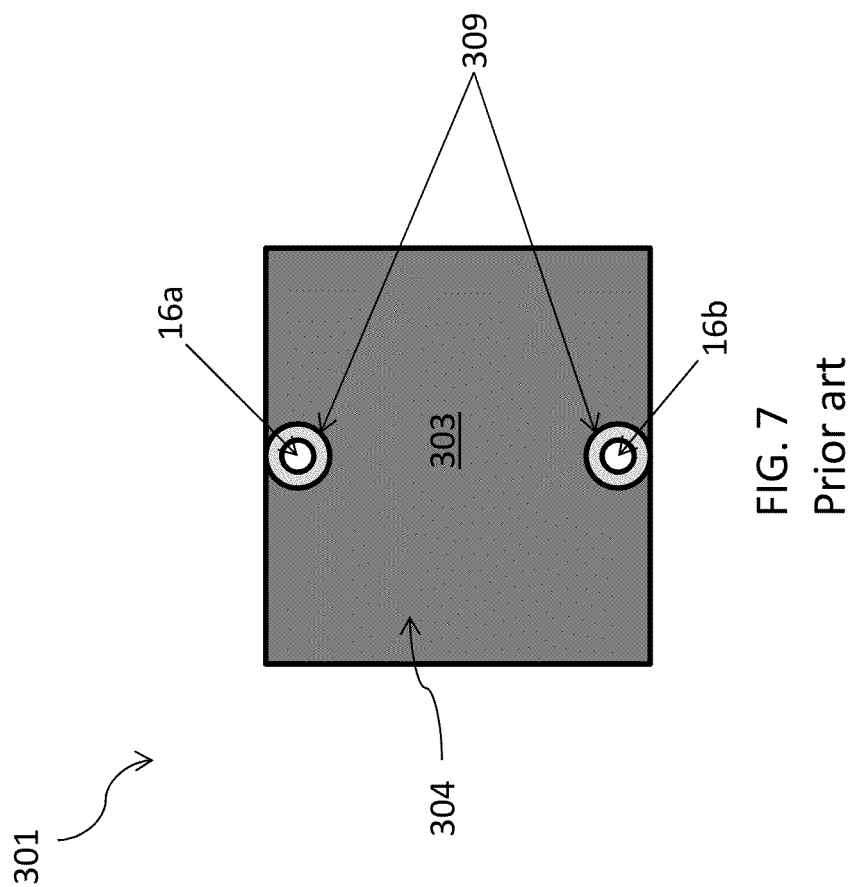
FIG. 7 is an overhead view of an end plate of the prior art having a small uncoated region.

A second embodiment for reducing fuel cell stack stress is shown in FIGS. 5-7. FIG. 5 is a partial cross-section view of an end plate 501 having a flow field area 507 and window seal area 515 over a first (e.g., fuel) side 502 of the end plate 501, and an interface seal 505 and protective coating 503 over a second (e.g., flat) side 504 of the end plate 501. The window seal area 515 is not recessed relative to the flow field area 507 in this embodiment, although it will be understood that in other embodiments the window seal area 515 may include a recessed portion as described above. As shown in FIG. 5, the thickness of the protective coating 503 in this embodiment is greater than in conventional end plates, such as shown in FIG. 3. The thickness of the protective coating 503 may be generally equal to the thickness of the interface seal 505. In embodiments, the thickness of the coating 503 may differ by less than 20%, such as by 0-10%, from the thickness of the interface seal 505.

In addition, the second (e.g., flat) side 504 of the end plate 501 may include an enlarged uncoated portion 509 surrounding the interface seal 505. FIG. 6 is an overhead view of the second (e.g., flat) side 504 of the end plate 501 of FIG. 5, with the interface seal 505 removed for clarity. The portion of the end plate 501 shown in side cross-section in FIG. 5 is provided along line B-B in FIG. 6. FIG. 7 is an overhead view of the flat side 304 of a prior art fuel cell end plate, such as end plate 301 shown in FIG. 3. As shown in FIG. 7, the protective coating 303 in the prior art endplate 301 extends over substantially the entire surface of the end plate 301 with the exception of small circular portions 309 surrounding the fuel holes 16a, 16b where the interface seals 305 are located. However, as discussed above, a relatively small misalignment of the interface seal 305 may result in at least a portion of the interface seal 305 being located on top of the coating 303, which may result in deformation of the end plate 301 and increased stress in the fuel cell stack.

In the embodiment of FIGS. 5 and 6, the size of the uncoated region 509 is increased relative to the prior art design shown in FIG. 7. In addition, the shape of the uncoated region 509 may be modified such that the periphery of the uncoated region 509 may include a generally straight portion 601 along the outer edge of the end plate 501 and a curved portion 603 (e.g., a semi-oval or semi-circular portion) facing the middle of the end plate 501, as shown in FIG. 6. In embodiments, the uncoated region 509 may be shaped like the letter "D."

The thicker protective coating 503 and enlarged uncoated portion 509 may allow more room for the interface seal, provide more tolerance for interface seal misalignment, and may reduce or eliminate endplate deformation by the interface seal. These design features may also help reduce stack camber (i.e., warping) caused by the interface seal. This may allow for reduced complexity and better reliability during hot box column assembly and operation.

The thicker protective coating 503 and/or enlarged uncoated portion 509 may be utilized on the flat side 504 of either a fuel-side endplate (e.g., where the "non-flat" side 502 of the endplate defines a fuel flow field, such as shown in FIG. 2B), an air-side endplate (e.g., where the "non-flat" side 502 defines an air flow field, such as shown in FIG. 2A), or on both the fuel-side and the air-side endplates of a fuel cell stack.

Figure 8:
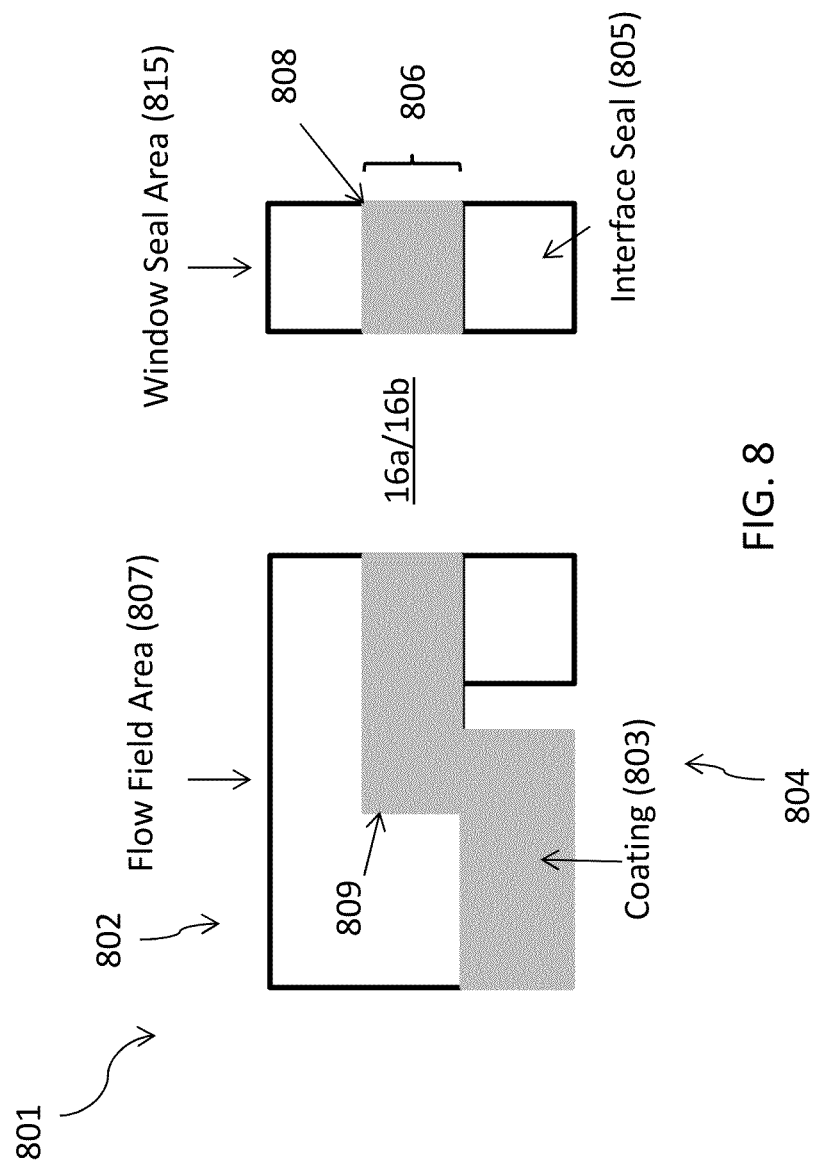
FIG. 8 is a partial cross-section view of an end plate having a recessed portion and an interface seal located in the recessed portion and over a protective coating according to an embodiment.

In a further embodiment, a recessed portion 806 may be provided on the second (e.g., flat) side 804 of the end plate 801, and the interface seal 805 may be provided over the recessed portion 806 on the second side 804 of the end plate 801, as shown in the partial cross-sectional view of FIG. 8. A thicker protective coating 803 may be utilized, as described above in connection with FIGS. 5 and 6. However, in the embodiment shown in FIG. 8, the protective coating 803 may extend over the entire surface of the end plate 801, including the recessed portion 806. The interface seal 805 may be provided over the protective coating 803 in the recessed portion 806. The size and/or shape of the recessed portion 806 may be similar to the size and shape of the enlarged uncoated portion 509 shown in FIGS. 5-6. For example, the periphery of the recessed portion 806 may include a generally straight portion 808 along the outer edge of the end plate 801 and a curved portion 809 (e.g., a semi-oval or semi-circular portion) facing the middle of the end plate 401, corresponding to the "D"-shaped pattern shown in FIG. 6.

Providing a recessed portion 806 on the flat side 804 of the end plate 801 may eliminate the additional processing that needed to provide an uncoated region of the endplate, which may reduce the cost of the endplate. Additionally, the depth of a recess or pocket formed during powder metallurgy compaction may be more repeatable and easier to control than controlling the thickness and/or coverage area of the protective coating. This design feature may also help to reduce stack camber caused by the interface seal. This may allow for reduced complexity and better reliability during hot box column assembly and operation.

The window seal area 815 is not recessed relative to the flow field area 807 in the embodiment shown in FIG. 8, although it will be understood that in other embodiments the window seal area 815 may include a recessed portion as described above.

Additional Improvements to Mitigate Fuel Cell Stress

Because electrolytes for SOFCs are typically thin and brittle ceramics, they are vulnerable to cracking due to bending induced by topography variation in the interfacing interconnects (ICs). Further, given that high volume manufacturing of interconnects may result in some variation in the interconnect topography, it is advantageous to utilize an interconnect design that minimizes sensitivity to the interconnect topography variation.

Figure 11:
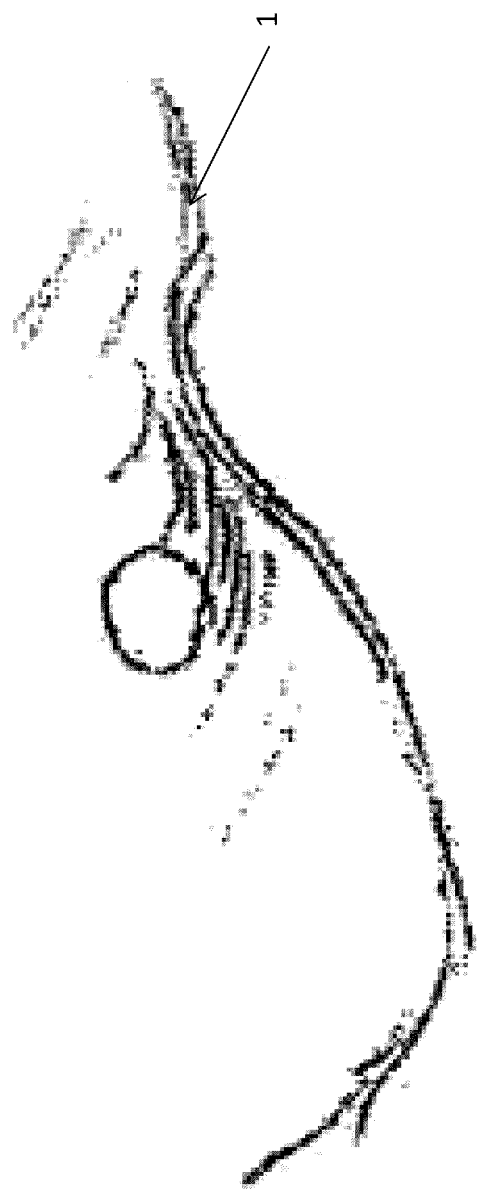
FIG. 11 schematically illustrates a compound bending of a fuel cell.

As discussed above, stresses in a fuel cell stack may be reduced by providing a recessed portion in the window seal area of a fuel end plate, where the recessed portion is located at least adjacent to the fuel inlet and outlet riser channel openings. However, when the recessed portion is only local to the region of the window seal area proximate to the fuel riser channel openings (i.e., there is no recessed portion elsewhere in the window seal area), stresses may still be imparted to the adjacent fuel cell and seals. FIG. 9A is an overhead view of the fuel (i.e., non-flat) side of a fuel end plate 901 and FIG. 9B is an overhead view of the air (i.e., cathode-facing) side of the adjacent interconnect 9. FIG. 10A is an exploded cross-section view of an end of a fuel cell stack 900, including the fuel end plate 901, a fuel cell 1 and an interconnect 9 taken along line D-D in FIGS. 9A-B. FIG. 10B is an exploded partial cross section view of the fuel cell taken along line E-E in FIGS. 9A-B. FIGS. 10A-B illustrate only a portion of a fuel cell stack 900 (with the fuel end plate at the top of the stack). A typical fuel cell stack 900 includes a plurality of fuel cells 1 and interconnects 9 alternately disposed between a first (e.g., fuel) end plate and a second (e.g., air) end plate, which in this embodiment would be located at the bottom of the stack. As illustrated in this embodiment, the fuel end plate 901 includes a recessed portion 906 in the window seal area 15c that is only local to the area proximate to the fuel riser inlet opening 16a (i.e., in the middle portion 908 of the window seal area 15c, as shown in FIGS. 9A and 10A). However, at the outer corners 910 of the end plate 901, the window seal area 15c is not recessed relative to the fuel flow field 907, as shown in FIGS. 10A-B. This configuration may result in undue stress being placed on the adjacent fuel cell 1, inducing the cell to bend around the y-axis and into the recessed portion 906. In addition, the air or cathode-facing side of the adjacent interconnect 9 includes elevated flat surfaces 15a, 15b surrounding the respective riser channel openings 16a, 16b on which a seal may be located. It is not uncommon for these flat elevated surfaces 15a, 15b to project slightly above the height of the air flow field 917, as schematically shown in FIGS. 10A-B. When the stack 900 is assembled, these flat elevated surfaces 15a, 15b may protrude into the recessed portions 906 of the end plate 901, which may exacerbate the bending of the fuel cell around the y-axis and may additionally induce the cell to bend around the x-axis. This compound bending of the fuel cell 1 in two axes (illustrated schematically in FIG. 11) may dramatically increase the stress in the cell, increasing the failure rate and reducing stack yield.

Therefore, it may be advantageous to provide a uniform recessed portion 906 of the fuel end plate over at least the entire edges of the window seal area 15c adjacent to the fuel riser channel openings 16a, 16b. In embodiments, the window seal area 15c may be recessed relative to the flow field 907 over the entire perimeter of the end plate 901. The window seal area 15c may be recessed relative to the flow field 907 by at least about 30 microns, such as 30-40 microns, which is generally within the topographical variation of the window seal area 15c. Additionally, since the above-described compound bending of the fuel cell may result from an interaction between topographical features of both the fuel end plate and the cathode-side of the adjacent interconnect, it may be advantageous to ensure that the flat elevated surfaces 15a, 15b surrounding the riser channel opening on the cathode side of the interconnect do not extend above (i.e., are not proud of) the air flow field features. Therefore, in embodiments, the flat elevated surfaces 15a, 15b may be recessed relative to the flow field 917. Since batch-to-batch variation of the flat elevated surfaces 15a, 15b is typically +/−20 um, introducing such a recess by design is likely to be optimal when it is nominally at least about 20 microns lower (e.g., 20-30 microns lower) than the height of the flowfield 917.

An embodiment of a fuel end plate 1201 with a uniform recessed portion 1206 is shown in FIG. 12A, and an embodiment of an interconnect 1209 with recessed surfaces 1215a, 1215b relative to the air flow field 917 is shown in FIG. 12B. FIG. 13A is an exploded cross-section view of an end of a fuel cell stack 1200, including the fuel end plate 1201, a fuel cell 1 and an interconnect 1209 taken along line F-F in FIGS. 12A-B. FIG. 13B is an exploded partial cross section view of the fuel cell taken along line G-G in FIGS. 12A-B. As can be seen in FIG. 13A, the recessed portion 1206 of the window seal area 15c extends along at least the two entire edges which are adjacent to the riser openings 16a, 16b of the end plate 1201, including the middle portion 1208 and the edge portions 1210 of the end plate 1201. The recessed portion 1206 may be substantially uniform around the entire perimeter of the end plate 1201. In addition, the flat elevated portions 1215a, 1215b may be recessed relative to the air flow field 917 (e.g., top surface of 1215a, 1215b lower than that of the ribs) on the cathode side of the interconnect 1209, as best illustrated in FIGS. 13A-B.

These features may be controlled in the interconnect and end plate manufacturing process through any number of methods, including compaction tooling change, powder fill optimization and additional compaction steps. The generally uniform recessed portion 1206 may be provided on the fuel (i.e., anode-facing) sides of the interconnects 1209 in addition to the end plate 1201.

Symmetrical Seal Loading on SOFC with External and Internal Manifolding for Reactants A fuel cell stack that is internally manifolded for reactants (e.g., fuel and air) typically includes sealing between the cell and interconnect around the perimeter of the cell. However, a fuel cell that is externally manifolded for reactants requires inlets and outlets between the fuel cells and interconnects where the cell and the interconnect are not sealed. For a fuel cell stack that that features internal manifolds for one reactant and external manifolds for the other reactant, there is an asymmetrical seal loading on the cell. For example, as described above in connection with FIGS. 2A-B, the fuel (i.e., anode-facing) side of the interconnect 9 may be sealed to the adjacent fuel cell via a window seal that extends around the perimeter of the interconnect 9 (see FIG. 2B), while the air (i.e., cathode-facing) side of the interconnect 9 is sealed to the cell using strip seals along two sides of the interconnect, while the other sides are not sealed to permit the air to enter and exit the cell (see FIG. 2A). This assymetrical seal loading may increase the stress in the cell. Various disclosed embodiments may address the problem of assymetrical seal loading by providing intermittent perimeter sealing in the inlet and outlet regions of externally manifolded fuel cells.

Having seals on both sides of the cell provides balanced forces on the cell, which is preferable. In the prior art interconnect 9 illustrated in FIGS. 2A-B, at the regions of the air inlet 117 and air outlet 119, there is a seal on the fuel side (i.e., a window seal on flat elevated portion 15c), but none on the air side, with the exception of the seal around the fuel hole (i.e., a circular or donut-shaped seal on elevated portions 15a, 15b). Applicants have discovered that this asymmetry may induce bending in the regions of asymmetrical seal loading and high stress around the fuel hole, frequently leading to cell cracking, and low stack manufacturing yield.

Figure 14:
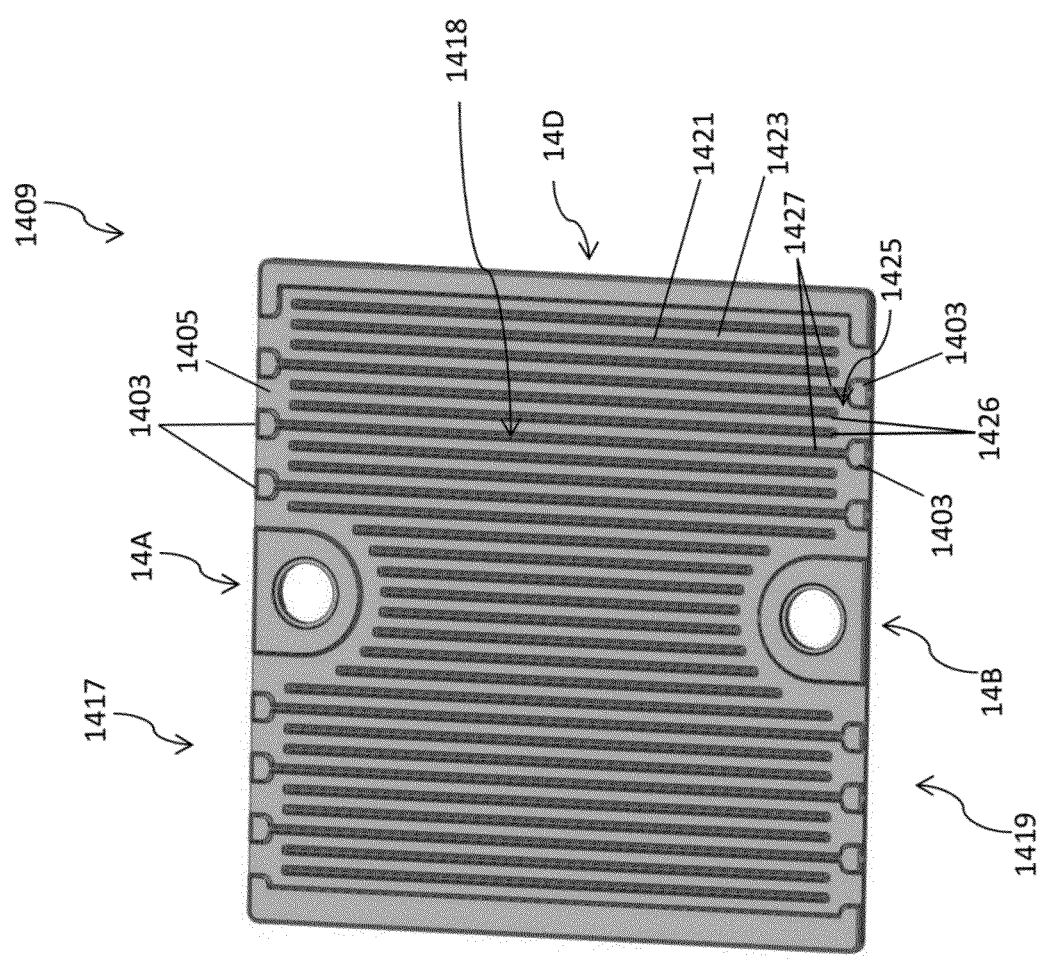
FIG. 14 illustrates the cathode side of an interconnect having raised islands for providing intermittent seal support according to an embodiment.

An embodiment of an interconnect 1409 having intermittent seal support on the cathode inlet and outlet is illustrated in FIG. 14. Intermittent seal support at the cathode inlet and outlet may reduce stress and bending while still allowing passages for the air to enter and exit the cell. As shown in FIG. 14, the cathode side of the interconnect 1409 may include discrete, raised seal support surfaces (i.e., "islands") 1403 at the cathode inlet 1417 and outlet 1419. The islands 1403 may comprise upraised portions of a metal alloy (e.g., chromium-iron) interconnect formed during powder metallurgy formation of the flowfield 1418 features (e.g., ribs 1421 and channels 1423) of the interconnect 1409. Gaps 1405 between the islands 1403 allow air to flow into the cathode inlet 1417, through the flow field 1418 defined by the ribs 1421 and channels 1423 and out through the outlet 1419. As shown in FIG. 14, the width of each island 1403 may be significantly greater than the width of the ribs 1421 in the flow field (e.g., at least about 2 times greater, such as 2-5 times greater, than the width of the ribs 1421). The relatively wider support islands 1403 may provide sufficient surface area to facilitate effective sealing to the adjacent fuel cell. In embodiments, the gaps 1405 between each island 1405 may also be wider than the width of the channels 1423 of the flow field 1418 (e.g., at least about two times wider, such as 2-5 times wider, than the width of the channels 1423), to enable the free flow of air into and out of the flow field 1418. The islands 1403 may be separated from the ribs 1421 (e.g., a gap 1425 is located between the end of a rib 1421 and an adjacent island 1403) and/or may be contiguous with one or more ribs 1421 (e.g., the end of the rib 1421 contacts the adjacent island 1403, such that the upraised portion defining the rib 1421 "flares out" in width proximate the inlet 1417 or outlet 1419 edge of the interconnect 1409 to define the island 1403). As shown in FIG. 14, for example, a first group of ribs 1426 are separated from the islands 1403, defining a gap 1425 between the ends of the ribs 1426 and the adjacent island 1403, and a second group of ribs 1427 is contiguous with the islands 1403. In FIG. 14, every third rib 1427 is contiguous with an island 1403. In various embodiments, every second rib to every fifth rib may be contiguous with an island 1403 along at least a portion of an edge 14A, 14B of the interconnect 1409.

An interconnect having intermittent support islands 1403 may promote symmetrical loading on the adjacent fuel cell, reducing stress at the fuel cell and improving stack manufacturing yields. In embodiments, a protective layer (e.g., MCO, LSM) may be provided over the cathode side of the interconnect 1409. In embodiments, the protective layer may not extend to the edges 14A, 14B of the interconnect 1409 containing the islands 1403 (e.g., islands 1403 are not coated with a protective layer). Seal material (e.g., a glass or glass-ceramic seal material) may be selectively deposited on the raised surfaces of the islands 1403, such as via a screen printing technique. FIG. 15A is a partial perspective view of an air (i.e., cathode facing) side of an interconnect 1409 having support islands 1403 along the edge 14A of the interconnect 1409 proximate the fuel riser channel opening 16a. A seal material 1503 (e.g., a glass or glass-ceramic seal) is shown on the raised surface of the islands 1503. A strip seal 1505 is shown extending along an upraised edge 14D of the interconnect 1409, and a generally circular or hollow-cylindrical seal 1507 is shown on the raised elevated surface 15a surrounding the fuel riser channel opening 16a. A generally circular seal may also be provided on the raised elevated surface 15b surrounding the fuel riser channel opening 16b (not shown).

Improved Seal Configuration

Due to the nature of the interconnect and fuel cell stack configuration, the generally circular seals dispensed around the fuel inlet and outlet riser channel openings on the cathode side of the interconnect may result in excessive localized stresses during stack sintering and conditioning. Various embodiments include a seal configuration that may reduce high stresses around the riser channel openings of the electrolyte. In addition, combining the novel seal configuration with an intermittent perimeter seal as described above, fuel riser opening stresses may be reduced even further, thus mitigating/eliminating cracks in electrolytes.

FIGS. 15A-B illustrate one example of a seal configuration on the cathode side of an interconnect 1409. As discussed above, a generally circular or hollow-cylindrical seal 1507 (e.g., donut shaped with circular outer diameter and circular inner opening) is located on the raised elevated surface 15a surrounding the fuel riser channel opening 16a. FIG. 15B is an enlarged overhead view of the area surrounding the riser channel opening 16a which shows the generally circular seal 1507 on the raised elevated surface 15a.

Applicants have discovered that the circular seal configuration of FIGS. 15A-B may result in excessive localized stress in the fuel cell stack. This may be the result of an asymmetric seal loading between the generally straight window seal on the anode side of the fuel cell and the circular seal on the cathode side of the fuel cell. FIGS. 16A-B illustrate an embodiment of a seal configuration in which the seal has a non-circular or non-cylindrical shape. The interconnect 1409 in this embodiment is identical to the interconnect shown in FIGS. 15A-B with the exception that the seal 1601 around the fuel riser channel opening 16a has a different configuration, as best illustrated in the enlarged overhead view of FIG. 16B. In this embodiment, rather than the generally circular seal 1507 of FIGS. 15A-B, the seal surrounding the riser channel opening 16a includes a generally straight segment 1607 and a curved segment 1605. The generally straight segment 1607 is on the side of the riser channel opening 16a facing the edge 1602 of the interconnect adjacent the riser channel opening 16a (i.e., it is located between the riser channel opening 16a and the edge 1602), and the curved segment 1605 is on the side of the riser channel opening 16a facing the middle of the interconnect (i.e., away from the edge 1602 of the interconnect 1409), as shown in FIG. 16B. The generally straight segment 1607 may be defined by a generally straight portion 1603 of the outer periphery of the seal 1601 and a generally straight portion 1604 of the interior opening of the seal. In certain embodiments, the seal 1601 may have a shape that generally corresponds to the letter "D," as shown in FIG. 16B. The straight segment 1607 may extend generally parallel to the edge 1602 of the interconnect 1409. In embodiments, the straight segment 1607 may overlap or coincide with the location of the window seal on the anode side of the fuel cell (see, e.g., FIG. 2B). In embodiments, the shape of the seal 1601 may generally conform to the shape of the elevated flat portion 15*a* of the interconnect 1409 surrounding the riser channel opening 16*a*, which as shown in FIG. 16B may also include a generally straight edge extending along the edge 1602 of the interconnect 1409 and a curved edge facing the middle of the interconnect 1409. The upraised intermittent support islands 1403 may also include a similar shape, having a generally straight edge extending along the edge of the interconnect 1409 and a curved edge facing the middle of the interconnect 1409.

Applicants have discovered that the seal configuration as shown in FIGS. 16A-B may provide significantly lower stress on the electrolyte, particularly around the fuel openings, than the conventional circular seal design as shown in FIGS. 15A-B. Finite element analysis (FEA) simulations of electrolyte fuel opening stresses during stack sintering (e.g., the melt and reflow of seals, as described above, also referred to as "seal squish") have shown that with an embodiment seal configuration such as shown in FIGS. 16A-B (i.e., a "D-shaped seal"), seal squish is spread over larger area thereby reducing local curvatures and high stresses around the fuel hole relative to a comparative example having a generally circular seal. In one simulation, the maximum stress of the embodiment (i.e., "D-shaped seal") configuration was reduced by more than 30% relative to a comparative example having a generally circular seal. With the addition of support islands, such as shown in FIG. 14 in addition to a "D-shaped" seal, the maximum stress was reduced by more than 34% relative to the comparative example without support islands and having a generally circular seal. FEA simulations of both the seal squish and post-conditioning stress analyses show significant stress reduction around electrolyte fuel hole using the embodiment seal configurations.

While solid oxide fuel cell interconnects, end plates and electrolytes are described above in various embodiments, embodiments can include any other fuel cell interconnects or end plates, such as molten carbonate, phosphoric acid or PEM fuel cell interconnects or end plates, or any other shaped metal or metal alloy or compacted metal powder or ceramic objects not associated with fuel cell systems.

The foregoing method descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

Further, any step or component of any embodiment described herein can be used in any other embodiment.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. An interconnect for a fuel cell stack, comprising:
   a plurality of ribs and channels on a first major surface of the interconnect defining a flow field for a first reactant;
   an opening extending through the interconnect for a second reactant;
   an elevated surface on the first major surface of the interconnect surrounding the opening; and
   a seal on the elevated surface and surrounding the opening, wherein the seal is a D-shaped seal comprising a generally straight segment facing an edge of the interconnect and a curved segment facing the flow field in a central portion of the interconnect, wherein the generally straight segment is defined by a generally straight portion of an outer periphery of the seal and a generally straight portion of an interior opening of the seal.

2. The interconnect of claim 1, wherein the opening comprises an inlet opening for the second reactant, the interconnect further comprising:
   an outlet opening for the second reactant extending through the interconnect;
   an additional elevated surface surrounding the outlet opening; and
   an additional seal on the additional elevated surface and surrounding the outlet opening, wherein the additional seal comprises a generally straight segment facing an edge of the interconnect and a curved segment facing the flow field in a central portion of the interconnect, wherein the generally straight segment is defined by a generally straight portion of an outer periphery of the additional seal and a generally straight portion of an interior opening of the additional seal.

3. The interconnect of claim 1, wherein the generally straight segment extends parallel and adjacent to the edge of the interconnect.

4. The interconnect of claim 1, wherein the generally straight segment overlaps or coincides with the location of a window seal on a second major surface of the interconnect.

5. The interconnect of claim 1, wherein the seal comprises at least one of a glass and glass-ceramic material.

6. The interconnect of claim 1, further comprising:
   a plurality of raised surfaces on the first major surface located between the edge of the interconnect and the flow field and intermittently spaced to provide gaps between the raised surfaces; and
   a seal material on the raised surfaces.

7. A method of fabricating an interconnect for a fuel cell stack, comprising:
   forming a plurality of ribs and channels on a first major surface of the interconnect to define a flow field for a first reactant;
   forming an opening extending through the interconnect for a second reactant;
   forming an elevated surface on the first major surface of the interconnect surrounding the opening; and
   providing a seal on the elevated surface and surrounding the opening, wherein the seal is a D-shaped seal comprising a generally straight segment facing an edge of the interconnect and a curved segment facing the flow field in a central portion of the interconnect, wherein the generally straight segment is defined by a generally straight portion of an outer periphery of the seal and a generally straight portion of an interior opening of the seal.

8. The method of claim 7, wherein the forming the opening comprises forming an inlet opening for the second reactant, the method further comprising:
   forming an outlet opening for the second reactant extending through the interconnect;
   forming an additional elevated surface surrounding the outlet opening; and
   providing an additional seal on the additional elevated surface and surrounding the outlet opening, wherein the additional seal comprises a generally straight segment facing an edge of the interconnect and a curved segment facing the flow field in a central portion of the interconnect, wherein the generally straight segment is defined by a generally straight portion of an outer periphery of the additional seal and a generally straight portion of an interior opening of the additional seal.

9. The method of claim 7, wherein the generally straight segment extends parallel and adjacent to the edge of the interconnect.

10. The method of claim 7, wherein the generally straight segment overlaps or coincides with the location of a window seal on a second major surface of the interconnect.

11. The method of claim 7, wherein the seal comprises at least one of a glass and glass-ceramic material.

12. The method of claim 7, further comprising:
   forming a plurality of raised surfaces on the first major surface located between the edge of the interconnect and the flow field and intermittently spaced to provide gaps between the raised surfaces; and
   providing a seal material on the raised surfaces.

* * * * *